US006449833B1

(12) United States Patent
Jessup et al.

(10) Patent No.: US 6,449,833 B1
(45) Date of Patent: Sep. 17, 2002

(54) AUTOMATION APPARATUS FOR INSTALLING AND REMOVING A METAL FINISHING BARREL LOCKING COVER

(75) Inventors: Richard J. Jessup, Bloomfield Hills; Gerald J. Romito, Rochester Hills; Mark Olstyn, Grosse Pointe Park, all of MI (US)

(73) Assignee: Jessup Engineering Inc., Rochester Hills, MI (US)

( * ) Notice: Subject to any disclaimer, the term of this patent is extended or adjusted under 35 U.S.C. 154(b) by 0 days.

(21) Appl. No.: 09/885,889

(22) Filed: Jun. 20, 2001

Related U.S. Application Data

(62) Division of application No. 09/813,649, filed on Mar. 21, 2001.

(60) Provisional application No. 60/261,104, filed on Jan. 11, 2001.

(51) Int. Cl.[7] .................................... B23P 19/00

(52) U.S. Cl. .................................... 29/804; 29/801

(58) Field of Search .................... 29/801, 804, 426.1, 29/426.5, 773

(56) References Cited

U.S. PATENT DOCUMENTS

| | | | | |
|---|---|---|---|---|
| 912,041 A | * | 2/1909 | Snow | 220/326 |
| 1,564,472 A | * | 12/1925 | Daly et al. | 220/345.1 |
| 3,256,170 A | * | 6/1966 | Neilson | 204/213 |
| 3,560,036 A | * | 2/1971 | Kiefer et al. | 204/213 |
| 3,588,984 A | * | 6/1971 | Van De Kerkhof | 29/564.4 |
| 4,418,460 A | * | 12/1983 | Ruth | 29/403.3 |
| 4,467,940 A | * | 8/1984 | Little | 220/314.1 |
| 5,490,321 A | * | 2/1996 | Kaneko | 29/714 |
| 5,980,084 A | * | 11/1999 | Jones et al. | 700/95 |

* cited by examiner

*Primary Examiner*—David P. Bryant
*Assistant Examiner*—Essama Omgba
(74) *Attorney, Agent, or Firm*—John R. Benefiel

(57) ABSTRACT

A metal finishing barrel side opening has a cover secured by a series of cover and barrel tabs, the cover slid into a secured position with the cover tabs partially overlain by the barrel tabs. A locking handle member assembly includes a graspable portion supported on a deflectable spring blade attached to the cover at one end which allows the handle assembly to move away from an aligned locator feature on the barrel as the cover is pushed into position. When the cover is shifted lengthwise, the handle assembly moves past the locking feature, and the locking blade pushes the handle assembly back down alongside the locking feature which then prevents reverse sliding of the cover back from under the barrel tabs. When the handle is pulled to initiate removal of the cover, the handle assembly is then moved out above the locking feature to enable the cover to be slid to the released position. After the barrel assembly is shuttled to a cover removal/installation station, and accurate located and oriented therein, an automation apparatus interacts with the member to automatically install and remove the cover, by camming the member out and shifting the cover to a release position. At the same time, rods have been advanced into a hole in each of a series of upright pieces projecting from the cover to enable powered lifting off of the cover after the cover is shifted to move the tabs out from under the barrel tabs. The sequence is reversed to replace the cover.

12 Claims, 11 Drawing Sheets

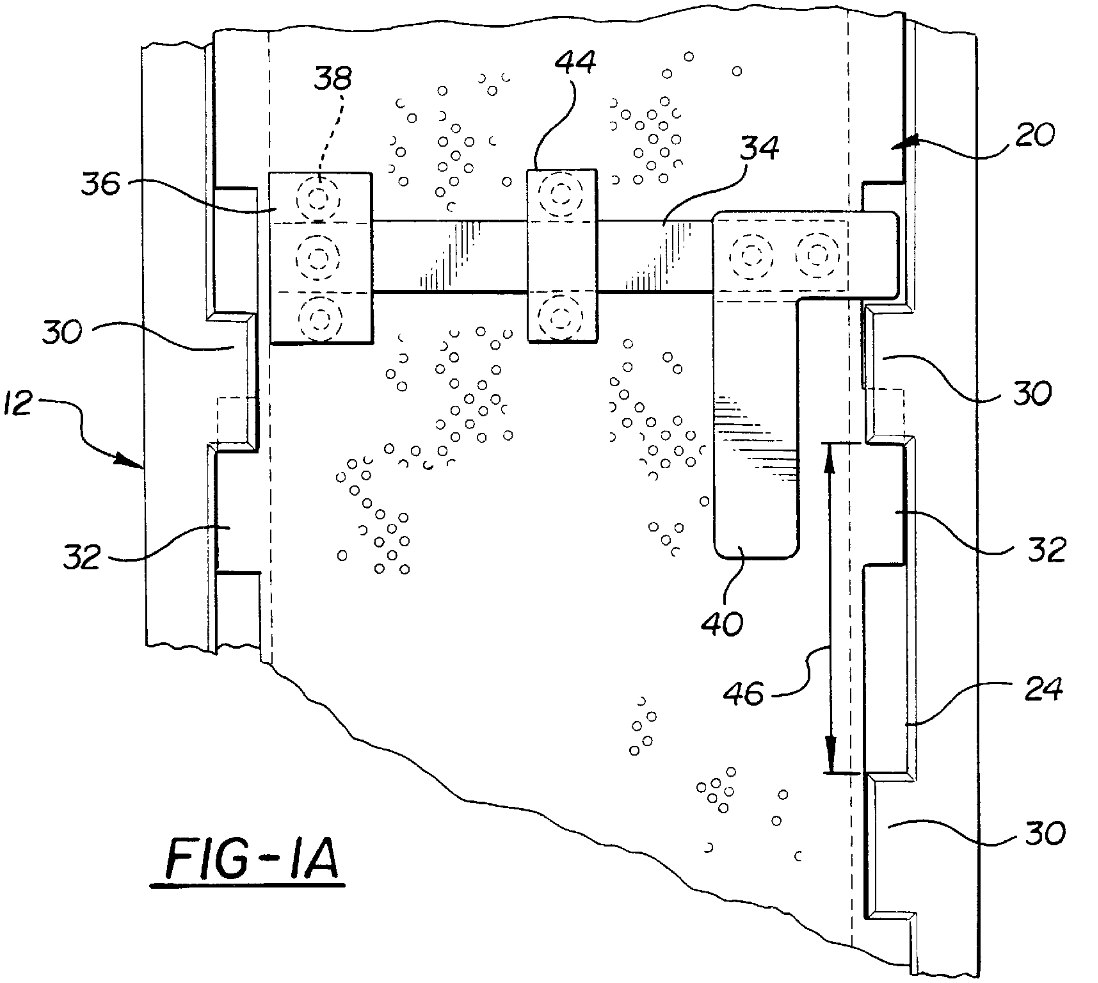
FIG-1A
FIG-2
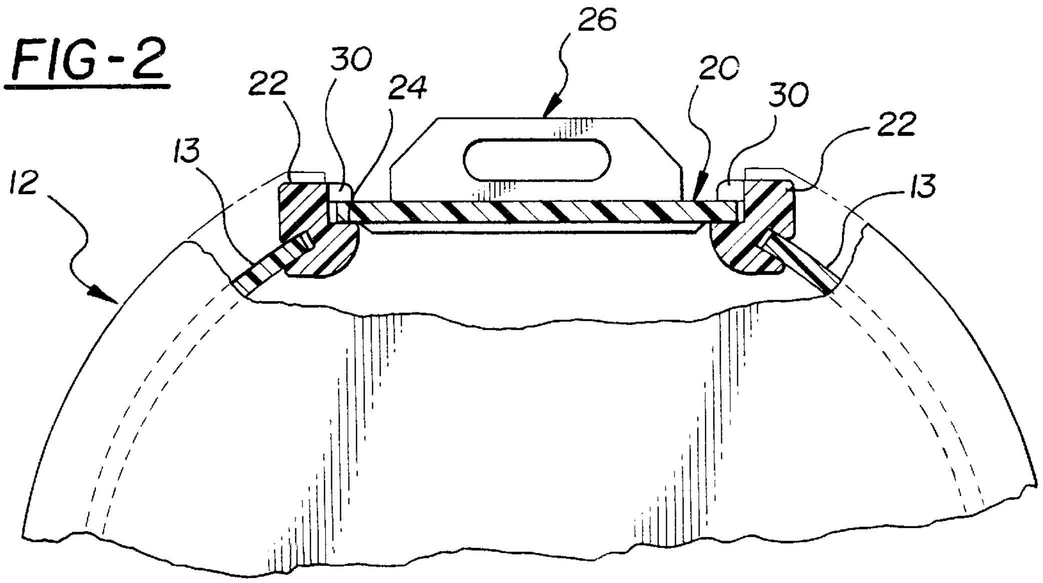

FIG-11
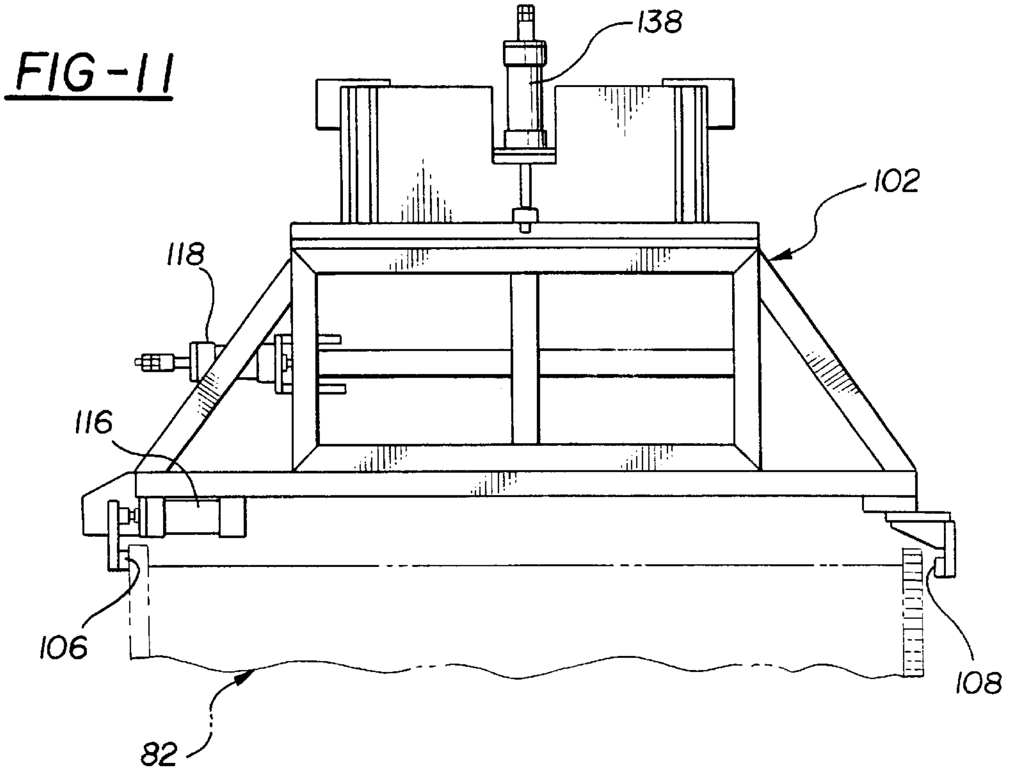
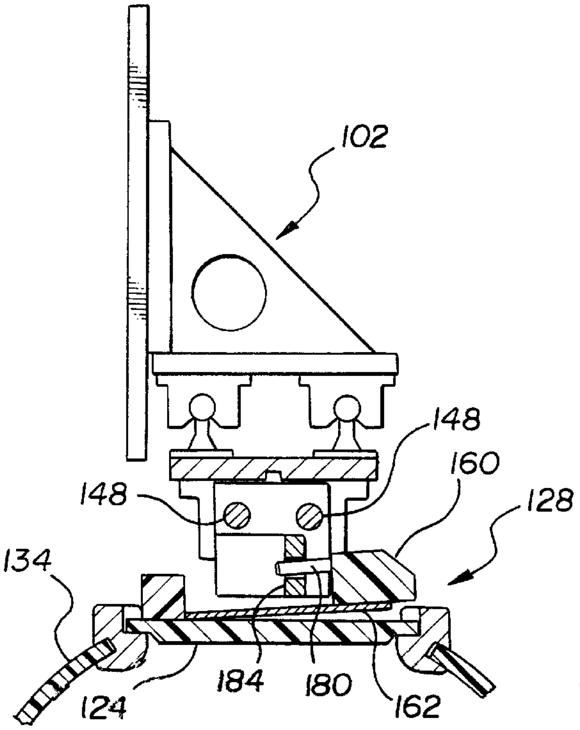
FIG-12
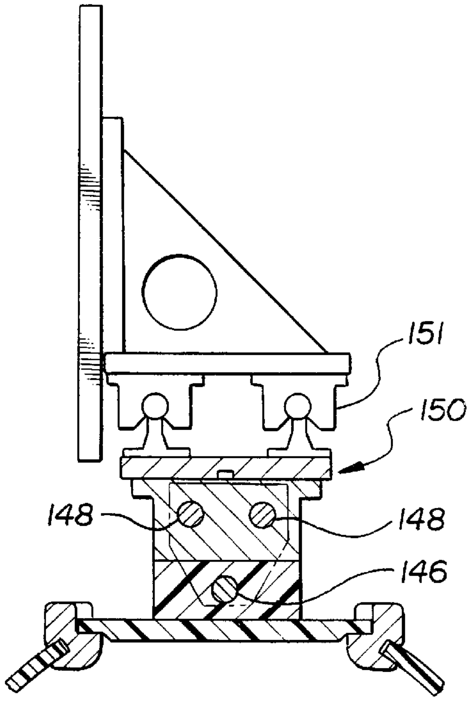
FIG-13

AUTOMATION APPARATUS FOR INSTALLING AND REMOVING A METAL FINISHING BARREL LOCKING COVER

CROSS REFERENCE TO RELATED APPLICATIONS

This application claims benefit of provisional serial No. 60/261,104, filed Jan. 11, 2001. This application is a division of copending application Ser. No. 09/813,649, filed on Mar. 21, 2001.

BACKGROUND OF THE INVENTION

This invention concerns metal finishing barrels used in the cleaning, plating, phosphating, etc. of metal parts in bulk.

Metal finishing barrels are constructed of materials which will not be attacked by the various processing solutions such as polypropylene or stainless steel. These barrels are perforated so as to allow the parts to be immersed when the barrel is lowered into a tank of a plating or other processing solution. The finishing barrel is rotatably mounted on a support structure to allow it to be rotated while immersed in the tank to tumble the parts, insuring even processing, and a gear is affixed to one end of the barrel for rotating the barrel with an electric motor.

One or more removable covers are installed over a loading/unloading opening provided in the side of the barrel. The covers must be closely fit to the opening to insure that small parts will not be captured in clearance cracks or escape through gaps between the cover and the barrel. The covers must also be held securely to withstand the heavy loads imposed by the weight of bulk quantities of metal parts as the finishing barrel is rotated.

These requirements have led to the development of an interlocking tab cover securement in which a series of tabs on each side of the cover are slid beneath barrel tabs projecting towards the barrel opening to secure the cover in position. A separate cover locking system is needed to positively prevent the cover from shifting back to release the tabs during processing. This locking system has previously taken the form of a polypropylene nut piece threaded into a gap between two covers arranged in end to end alignment over the opening, preventing the covers from shifting back to disengage the tabs.

This arrangement has worked very well, but requires the threading and unthreading of the separate nut piece, significantly slowing the process of installing and removing the covers manually. Further, this system makes it difficult to automate the cover installation and removal process, which automation is often desirable.

In the parent application Ser. No. 09/813,649, filed on Mar. 21, 2001, a processing barrel cover locking system is described and claimed which is positive and secure while not requiring separately installed locking system components, speeding up the installation and removal of the covers.

This system involves a handle which is mounted on a spring blade which allows the handle to move out when being removed and is urged back when released to move into a positive blocking position preventing endwise movement of the cover so as to be securely captured by the tabs.

It is the object of the present invention to provide an automation apparatus for automatically installing and removing covers on metal finishing barrels which are secured by tabs interfit by an endwise sliding of the cover in the barrel opening, and locked by a spring blade mounted handle.

SUMMARY OF THE INVENTION

The above recited objects of the invention, as well as other objects which will be understood upon a reading of the following specification and claims, are achieved by an apparatus utilized with a barrel cover having a cover handle assembly mounted thereto including a spring blade attached at one end to the cover. The cover and barrel are each formed with a series of interfit tabs, which allow the cover to be placed into the barrel opening with the tabs offset. When the cover is slid endwise in one direction, the cover tabs are positioned lying partially beneath the barrel tabs to be interengaged and hold the cover over the barrel opening.

The handle assembly is aligned between successive cover tabs to engage a barrel tab when the cover is pushed into place onto the barrel opening, but the spring blade mounting allows the handle to be moved out to allow the cover to be advanced so that the cover tabs are positioned beneath the barrel tabs. The cover is then slid to a tab-engaged position with the cover tabs partially lying beneath the barrel tabs to secure the cover in position over the barrel opening.

When the handle is released, the spring blade causes the handle assembly to move back down against the cover, with the handle assembly then located just to one side of one of the barrel tabs. The handle assembly has a locking portion which is then located to one side of that barrel tab, acting to block any reverse shifting of the cover back out from under the barrel tabs, to positively lock the cover in the secured position. A separate feature can also be used instead of a barrel tab to interact with the handle assembly locking portion.

The handle assembly moves away from the cover when the handle is pulled as the cover is being removed against the force generated by the spring blade, to elevate the handle blocking portion above the barrel tab.

This outward movement of the handle assembly allows the cover to be slid back out from under the barrel tabs and then lifted off the barrel opening.

In the automation apparatus according to the invention, the finishing barrel is first transported to a cover installing/removal station in a predetermined angular orientation, where the automation apparatus is shifted endwise to be accurately located laterally relative to the barrel in preparation for a cover removal and installation at the station.

The automation apparatus includes a series of cross slides advanced to the barrel before and after it is located in position. An angle slide moves down to the cover with a fork capturing an upright piece on the cover. A cam carried on a first sideways moving slide included in the apparatus acts on a rod on the cover handle, camming the handle outwardly. The first slide also advances a series of rods into bores each in a respective one of a series of upright pieces attached to the cover. The cover is then advanced in the same direction by a second sideways moving slide to move the cover tabs out of engagement with the barrel tabs and allow the cover to be lifted off the barrel by the motion of the angle slide. The cover is installed by a reverse sequencing of the various slides.

DESCRIPTION OF THE DRAWINGS

FIG. 1A is an enlarged top view of a portion of the barrel assembly shown in FIG. 1.

FIG. 2 is a fragmentary end view of the finishing barrel assembly shown in FIG. 1.

FIG. 11 is a front view of the cover handling automation components utilized for lengthwise location of the barrel assembly partially shown in phantom lines.

FIGS. 12 and 13 are fragmentary sectional views through the upper portion of a barrel assembly and part of the cover handling automation apparatus in engagement therewith, shown rotated from the inclined position to a vertical position.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
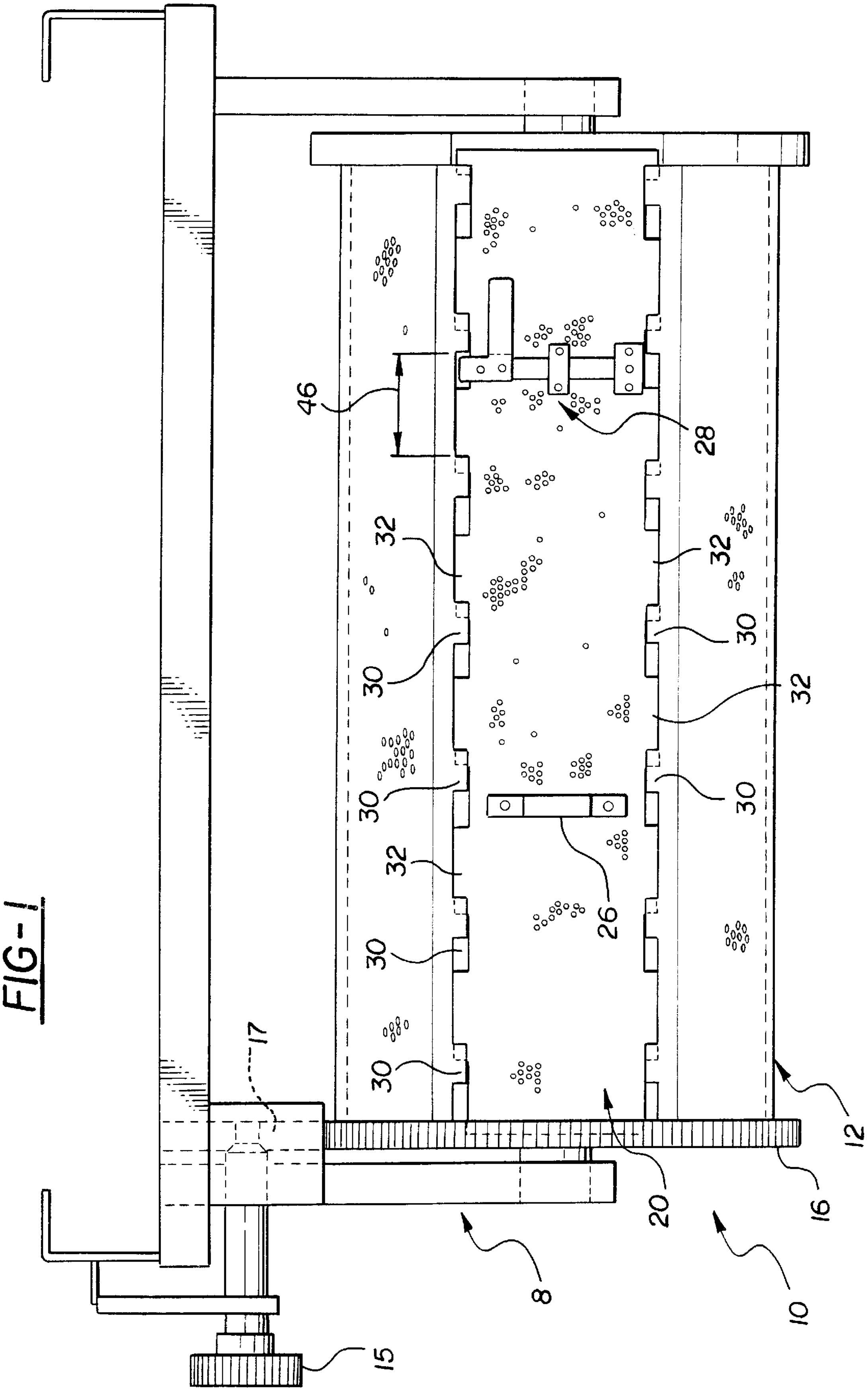
FIG. 1 is a top view of a metal finishing barrel assembly and super structure incorporating a cover lock of the type operated by the automation apparatus according to the invention.

Referring to the drawings and particularly FIG. 1, a metal finishing barrel assembly 10 is shown of a well known type, including a perforate barrel 12 rotatably supported on a super structure 8. A large polypropylene gear 16 is affixed to one end for rotating the barrel 12 while immersed in a solution in a processing tank (not shown) for uniform treatment of metal parts, using motor driving gears 15, 17 in the well known manner.

The barrel 12 has a lengthwise loading/unloading access side opening 18 (FIG. 2) formed therein of a generally rectangular shape. A perforate cover 20 is fit into the opening 18 and secured therein after the parts to be processed have been loaded. The opening 18 is defined by two rectangular frame pieces 22 having slots receiving the barrel wall 13. The barrel wall 13 shown is constructed of one half inch thick polypropylene plastic which has been stress relieved. Holes are drilled into the barrel wall 13 and cover 20 to allow the plating or other solutions to freely enter the barrel to reach the parts loaded therein.

A pair of handle assemblies 26, 28 are attached to the cover 20 for manually lifting the cover 20 into and out of the opening 18.

The handle assembly 28 incorporates features comprising part of a self acting cover locking system, described below.

The frame 22 defines a ledge 24 on which the bottom of the cover rests. A series of spaced barrel tabs 30 are arrayed along the length of each side of the opening 18 projecting inwardly towards the opening 18. A corresponding series of spaced cover tabs 32 are arrayed along each side of the cover 20.

The tabs 30, 32 are configured so that in an offset position, the cover tabs 32 can pass between the barrel tabs 30 so as to position the cover tabs 32 below the barrel tabs 30, the cover 20 resting on the ledge 24.

When the cover 20 is shifted to the left as shown in FIG. 1, the cover tabs 32 move to a position lying partially beneath the barrel tabs 32, to secure the cover 20 over the opening 18.

Figure 3:
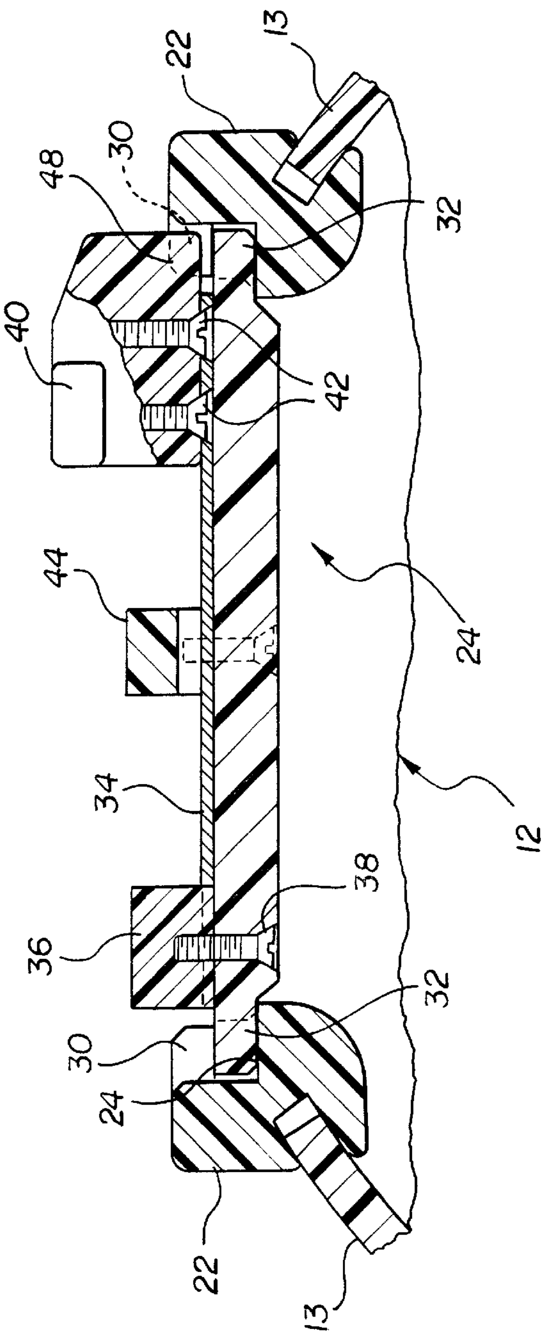
FIG. 3 is an enlarged fragmentary sectional view taken through the barrel and cover with the handle assembly shown in the locked condition.

The locking handle assembly 28 includes a resiliently deflectable spring blade 34 (FIGS. 1A, 3, 3A) fixed at one end to the cover 20 by a clamping block 36 and titanium screws 38. A handle member 40 is attached to the free end of the spring blade 34 as by titanium screws 42. A restraint piece 44 is secured to the cover 20 intermediate the length of the spring blade 34 limiting its upward movement and preventing any substantial sideways movement.

The cover 20 is lifted by grasping the handles 26 and 40 and placed over the opening 18 with the cover tabs 32 aligned with the gaps 46 between the barrel tabs 30.

Figure 3A:
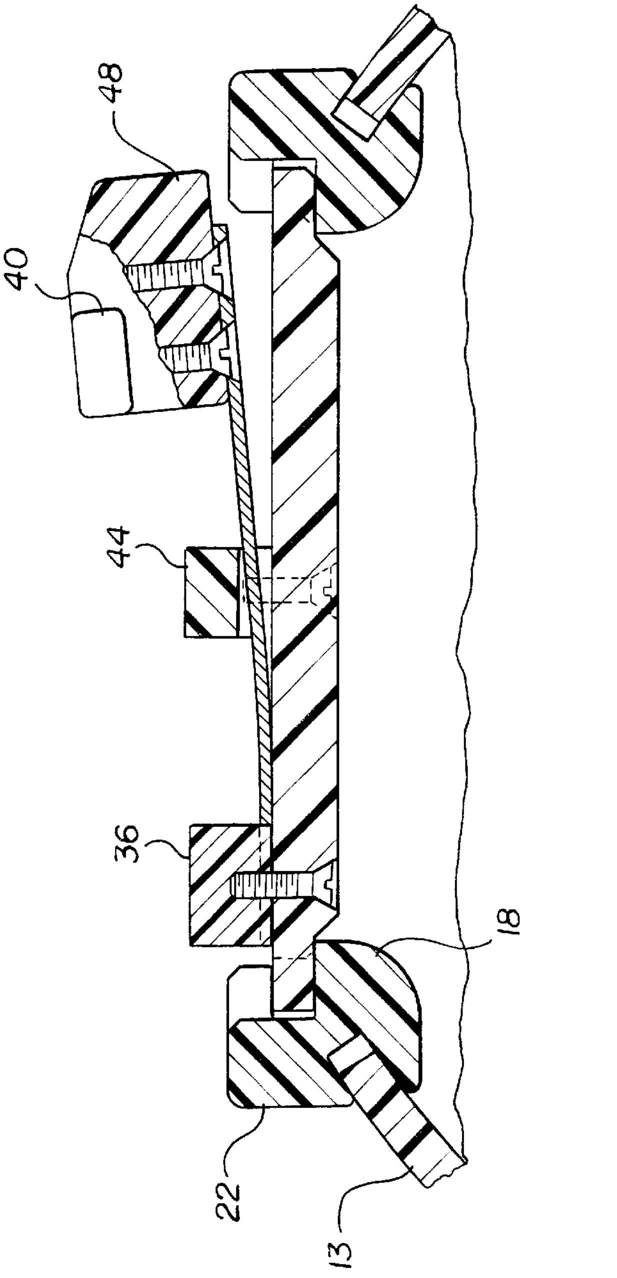
FIG. 3A is the same view as FIG. 3 but shows the handle assembly in the released position.

The cover 20 is pushed down into the opening 18. The locking handle member 40 is aligned with a barrel tab 30 in this position, but is deflected away as the cover 20 is seated on the lip 24 to accommodate movement of the cover tabs 32 below the barrel tabs 30 (FIG. 3A).

Next, the cover 20 is slid to the left as seen in FIG. 1, until the left end abuts the gear end 16 of the barrel 12. In this position, the cover tabs 32 are partially overlain by the barrel tabs 30 to capture the cover 20 in the barrel opening 18. In this position, the handle piece nose 48 (FIGS. 3, 3A) lies aligned with a gap 46 (FIG. 1A) between two barrel tabs 30. Thus, when the handle member 40 is released, the spring blade 34 pushes the nose portion 48 down to the left of the adjacent barrel tab 30. The barrel tab 30 thus acts as a locking feature element with respect to the nose portion 48, preventing the cover 20 from shifting to the right to allow the cover tabs 32 to move back away from their position captured beneath the barrel tabs 30.

Accordingly, a positive cover locking action is automatically achieved without any further action than that required to secure the cover 20 in place.

Figure 4:
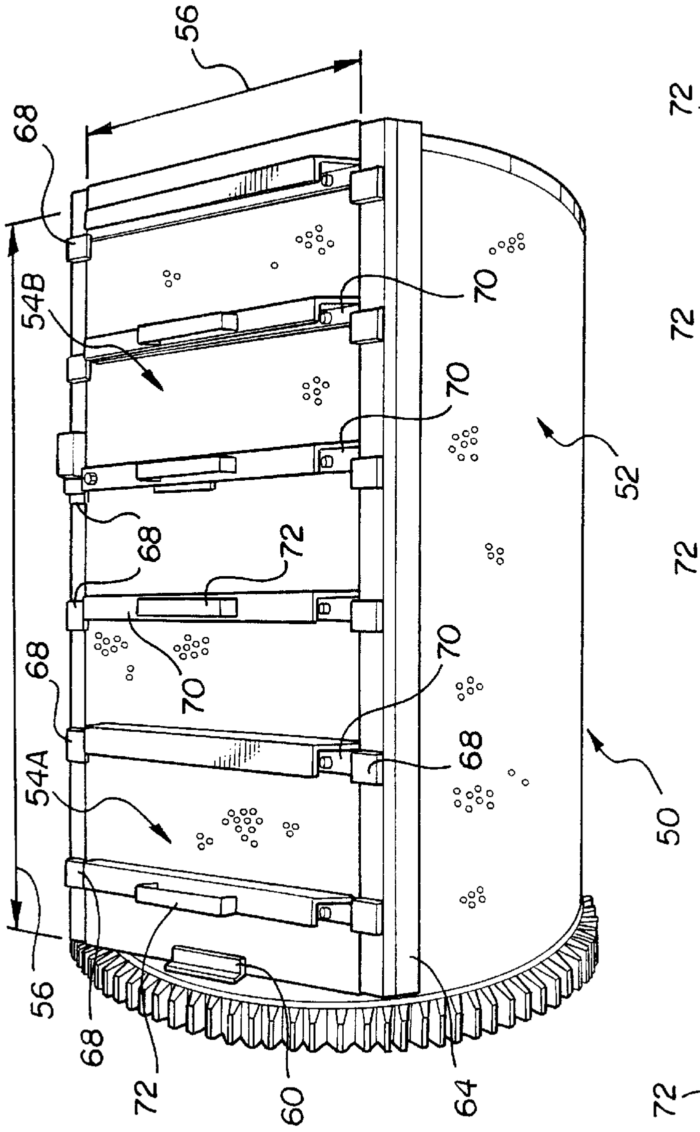
FIG. 4 is a perspective view of a second embodiment of the finishing barrel assembly including a cover locking system according to the invention.
Figure 5:
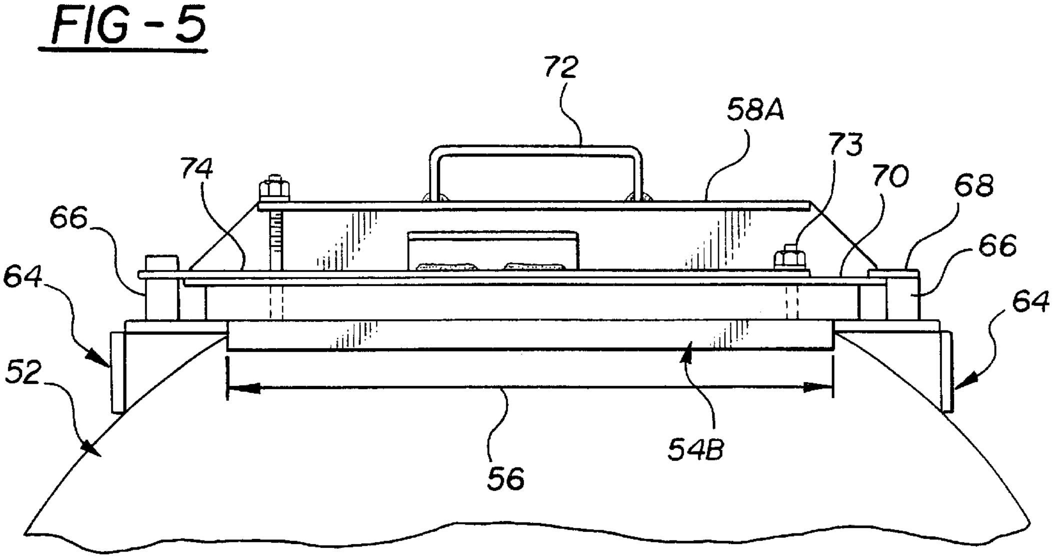
FIG. 5 is a fragmentary end view of the barrel assembly shown in FIG. 4.
Figure 6:
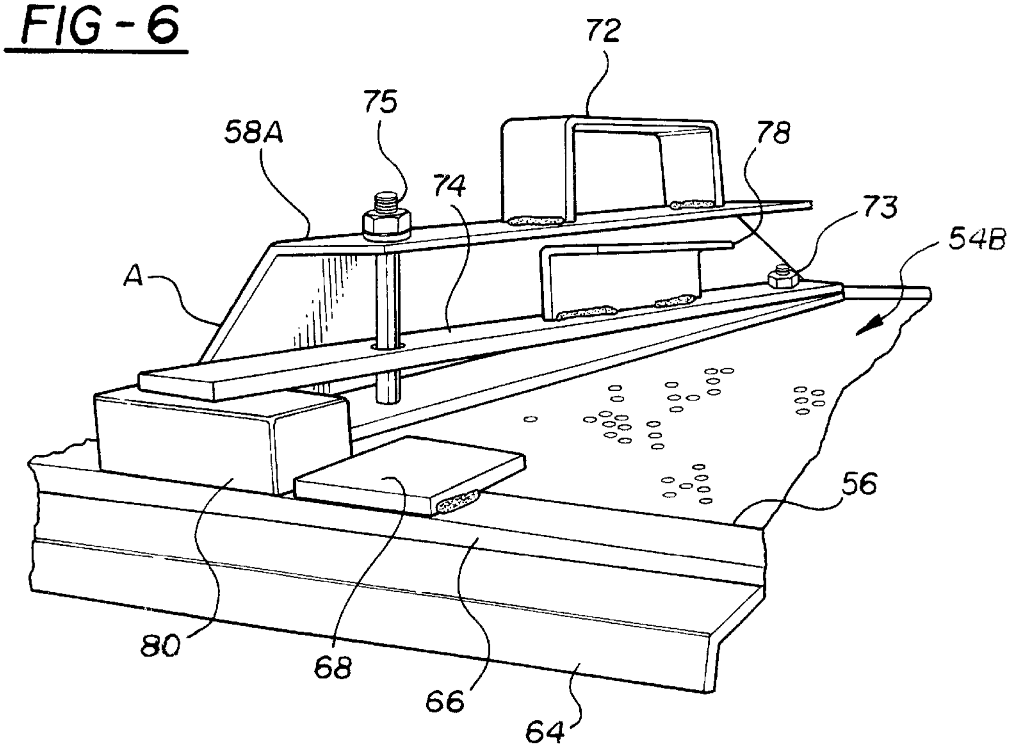
FIG. 6 is an enlarged perspective view of the locking handle assembly and portions of the cover and barrel shown in FIG. 4 and 5.

Heavier duty metal finishing barrels are utilized in some processes, as in phosphating, and are typically constructed of metal such as stainless steel instead of plastic. FIGS. 4–6 show such a barrel assembly 50 including the barrel 52 and two covers 54A, 54B aligned end to end over a lengthwise opening 56 in the side of the barrel 52. The covers 54A, 54B shown are of polypropylene while the barrel 52 is made of stainless steel, but the covers 54A, 54B could be also made of stainless steel to minimize thermal growth and chemical expansion to avoid any tendency for wedging of the covers in place if higher temperature conditions are present.

Figure 4A:
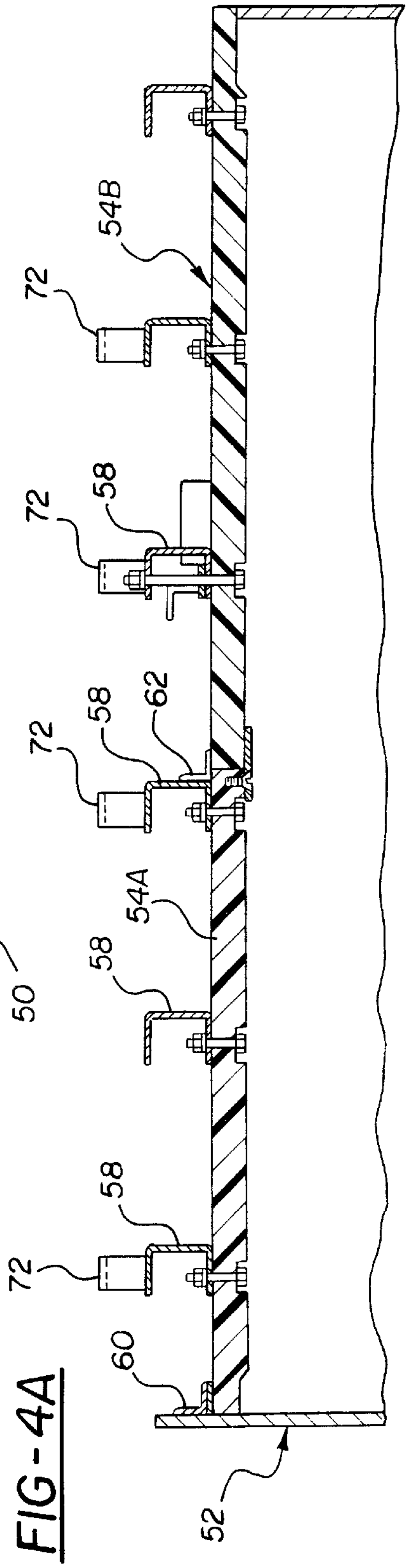
FIG. 4A is a fragmentary sectional view of the top portion of the barrel assembly shown in FIG. 4.

A series of metal channels 58 are attached to each cover 54A, 54B as shown in FIG. 4A. Angles 60, 62 insure a snug fit of the covers 54A, 54B.

A stainless steel frame 64 is welded to the barrel 52 defining the opening 56, with a spacer square bars 66 welded atop the frame 64 to support a series of barrel tabs 68 welded thereto.

Each end of each channel 58 is cut off at an angle A, and a bottom portion forms a cover tab 70 adapted to be slid below a corresponding barrel tab 68 as best seen in FIG. 4.

Each cover 54A, 54B has a pair of handles 72 welded to respective channels 58, enabling manual lifting of each of the covers 54A, 54B.

One of the channels 58A has a spring blade 74 mounted within it, anchored at one end by one of the attachment bolts 73 for the channel 58A itself (FIG. 6). The spring blade 74 extends within the channel 58A and projects beyond the opposite end. A bolt 76 passes through a hole in the spring blade 74 and the channel 58A, allowing up and down movement of the free end of the spring blade 74, but restraining, sideways movement. An angle 78 is welded to the top of the spring blade 74 and serves as a handle to lift the spring and limits the extent of up and down movement.

A stop block element 80 is welded next to a barrel tab 68, which element 80 is aligned with the projecting end of the spring blade 74 when the cover tabs 70 are aligned with the spaces to the right of the barrel tabs 68 when installing the cover 54B. The spring blade 74 deflects upwardly when the cover 54B is pushed down over the opening 56 as seen in FIG. 6.

Referring to FIGS. 7–16, a version of the above described cover lock system for use with an automation apparatus for removing and replacing the cover according to the invention is shown, along with an embodiment of the automation apparatus.

A series of aligned upright pieces 122 (FIGS. 8, 9) are attached to the cover 124, each formed with a chamfered through bore 126. A single locking handle assembly 128 is provided.

The cover 124 has a series of tabs 130 projecting outwardly along each side.

The barrel 134 has a series of tabs 132 projecting inwardly towards a rectangular loading access 136 opening in the barrel side defined by a frame 138 (FIGS. 12–16).

Figure 14:
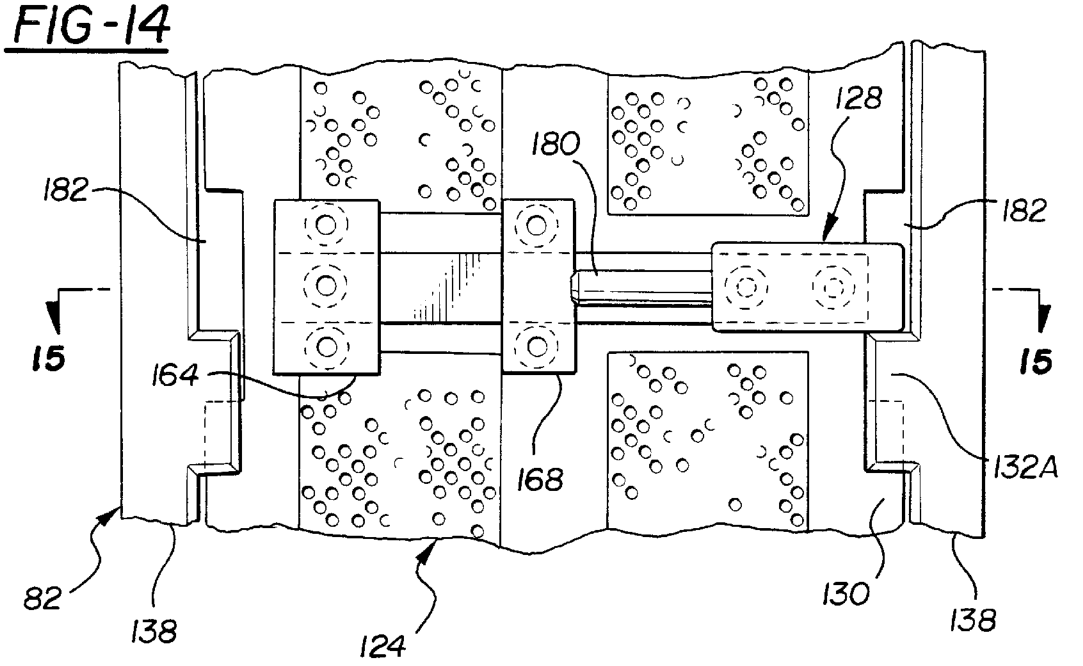
FIG. 14 is an enlarged plan view of a fragmentary portion of the barrel assembly showing the locking handle assembly.
Figure 15:
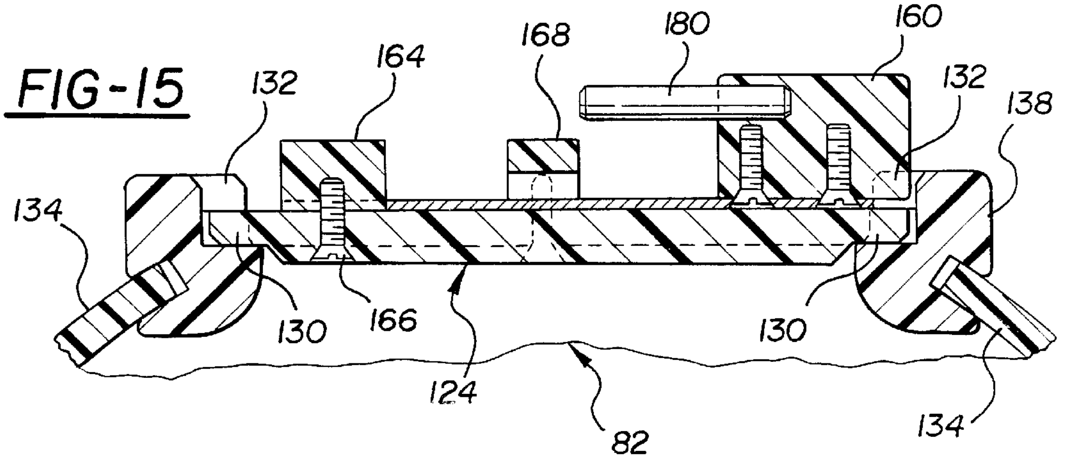
FIG. 15 is a view of the section 15—15 taken in FIG. 14.
Figure 16:
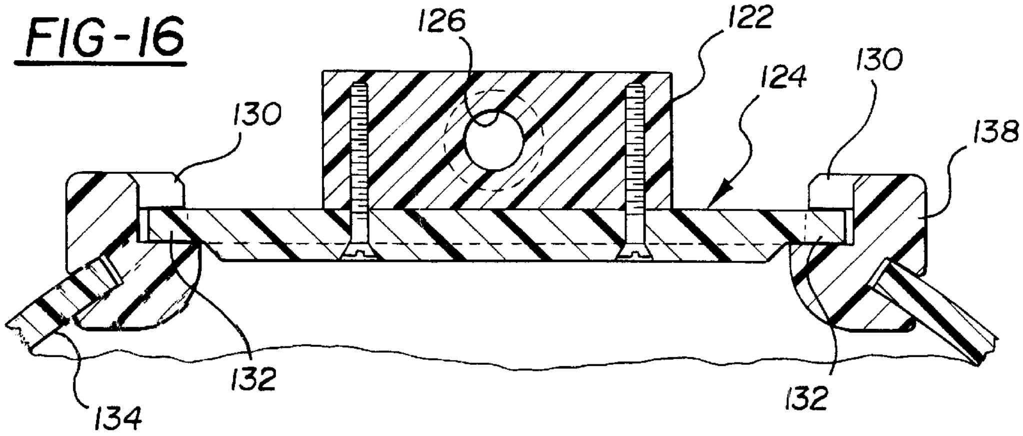
FIG. 16 is a sectional view taken through one of the upright pieces projecting from the barrel cover.

The cover 124 can be manually placed on the barrel opening 136 atop the frame 138 by aligning the cover tabs 130 with the spaces between the barrel tabs 132 as in the above described embodiments and then sliding the cover 124 lengthwise to carry the cover tabs 130 beneath the barrel tabs 132 (FIG. 14).

However, both the installation and removal may also be done automatically by the automation apparatus described below.

Figure 7:
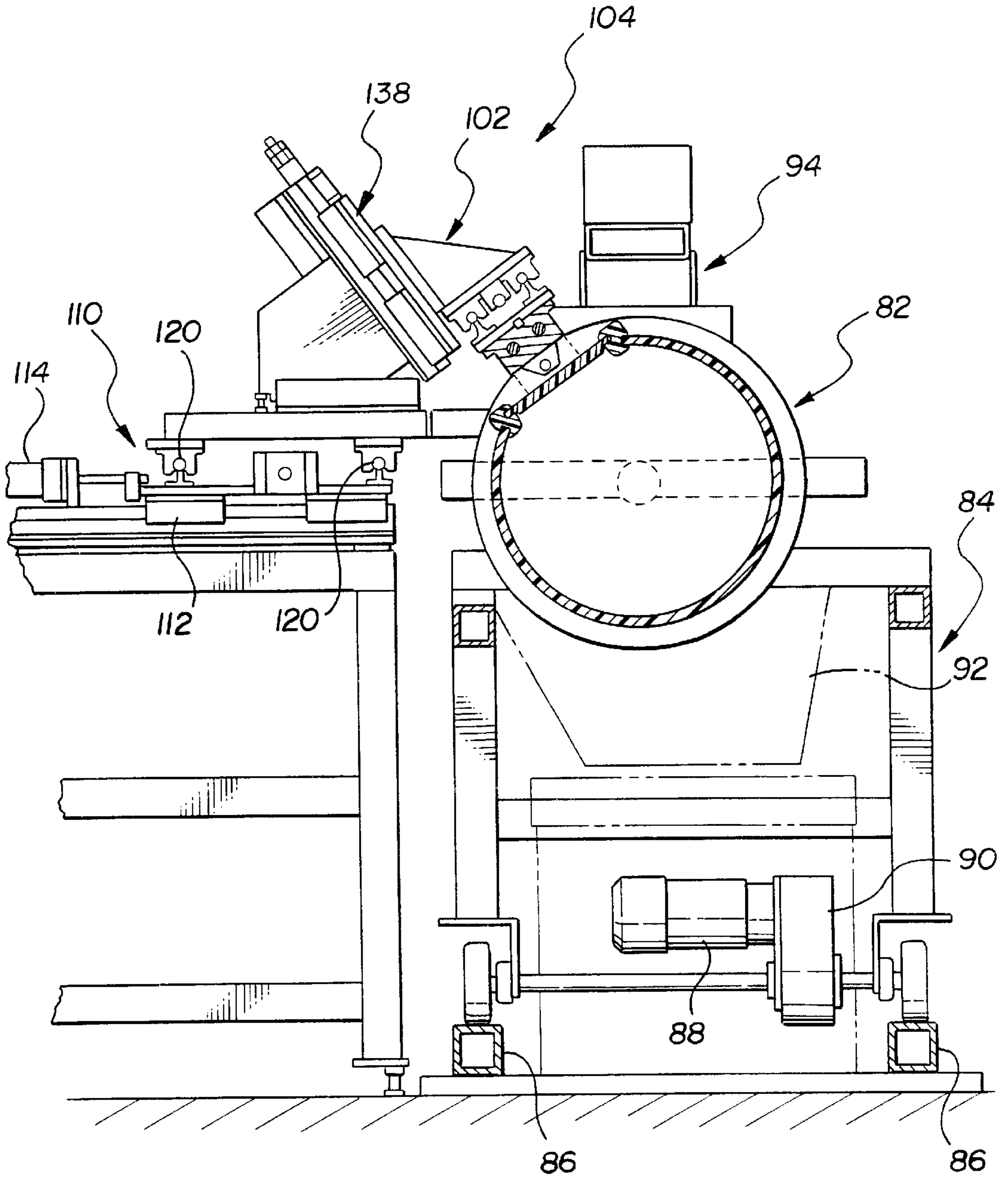
FIG. 7 is an end view of a finishing barrel assembly loaded in a transfer shuttle and positioned adjacent to a cover removal and installation station of a cover removal and installation automation apparatus according to the invention.
Figure 8:
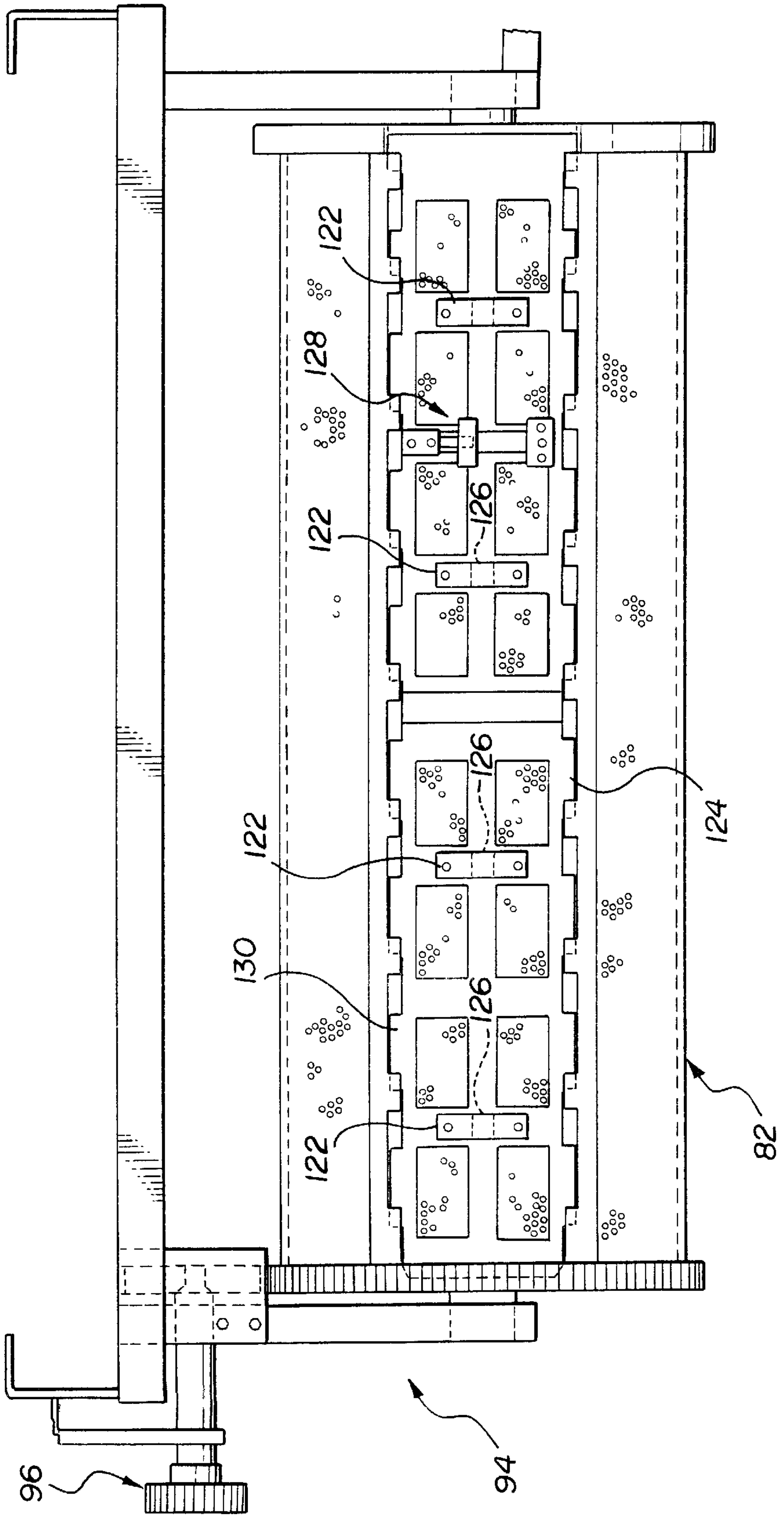
FIG. 8 is a front elevational view of the barrel assembly and a support structure therefor.

A metal finishing barrel assembly 82 is of the type described above is transported by a shuttle cart 84 to and from the processing system in which it is used (FIG. 7).

The shuttle cart 84 rides on rails 86, and is powered with an electric motor 88 and gear reduction 90. An unload chute 92 can be provided to direct parts being unloaded into the appropriate container.

The barrel assembly 82 is rotatable on a super structure 94 (FIG. 8), driven by gearing 96 and a drive motor 98 (depicted diagrammatically) carried on the cart 84. The barrel assembly 82 is rotated thereby to a rough located position by use of a target and sensor (not shown), where the cover 124 is approximately located opposite a cover engagement slide 102 moveable upwardly at an angle, the slide 102 is part of the cover removal and installation apparatus 104.

The cover 124 is angled up so that parts will not be lost when the cover 124 is removed.

The shuttle cart 84 is driven into the cover handling station to a location where the barrel assembly 82 will be disposed between a pair of end locators 106, 108 which have previously been widely separated to a distance greater than the length of the barrel assembly 82. A platform power slide 110 which carries the end locators 106, 108 and power slide 102 is then driven toward the barrel assembly on ways 112 by an actuator 114 (FIG. 7) to a position where the end locators 106, 108 are within the boundaries of the ends of the barrel assembly 82 (FIG. 11).

The endwise platform power slide 110 which carries end locators 106, 108 and power slide 102 is located endwise with respect to the barrel assembly 82 by first moving the locator 106 toward the right against the left or idle end face of barrel assembly 82 by an actuator 116 as shown in FIG. 11. After contact is made, further travel of locator 106 is prevented by the weight resistance of the barrel assembly 82, such that further travel of actuator 116 instead causes platform slide 110 which carries slide 102 and locator 108 to move toward the left on ways 120, forcing the locator actuator 118 to retract which is allowed by connecting that actuator to drain, until locator 108 contacts the right or gear end face of the barrel assembly 82 and locator actuator 118 reaches its positive stop. At this point the barrel assembly 82 is located in the station precisely in front of the cover handling apparatus 104, regardless of the initial non-precise positioning of the barrel assembly 82 by the shuttle cart 84 relative to the cover handling apparatus 104.

The barrel assembly 82 is then rotated to a "fine" located position by operation of the motor 98, using a second target and sensor (not shown) to accomplish this.

Figure 9:
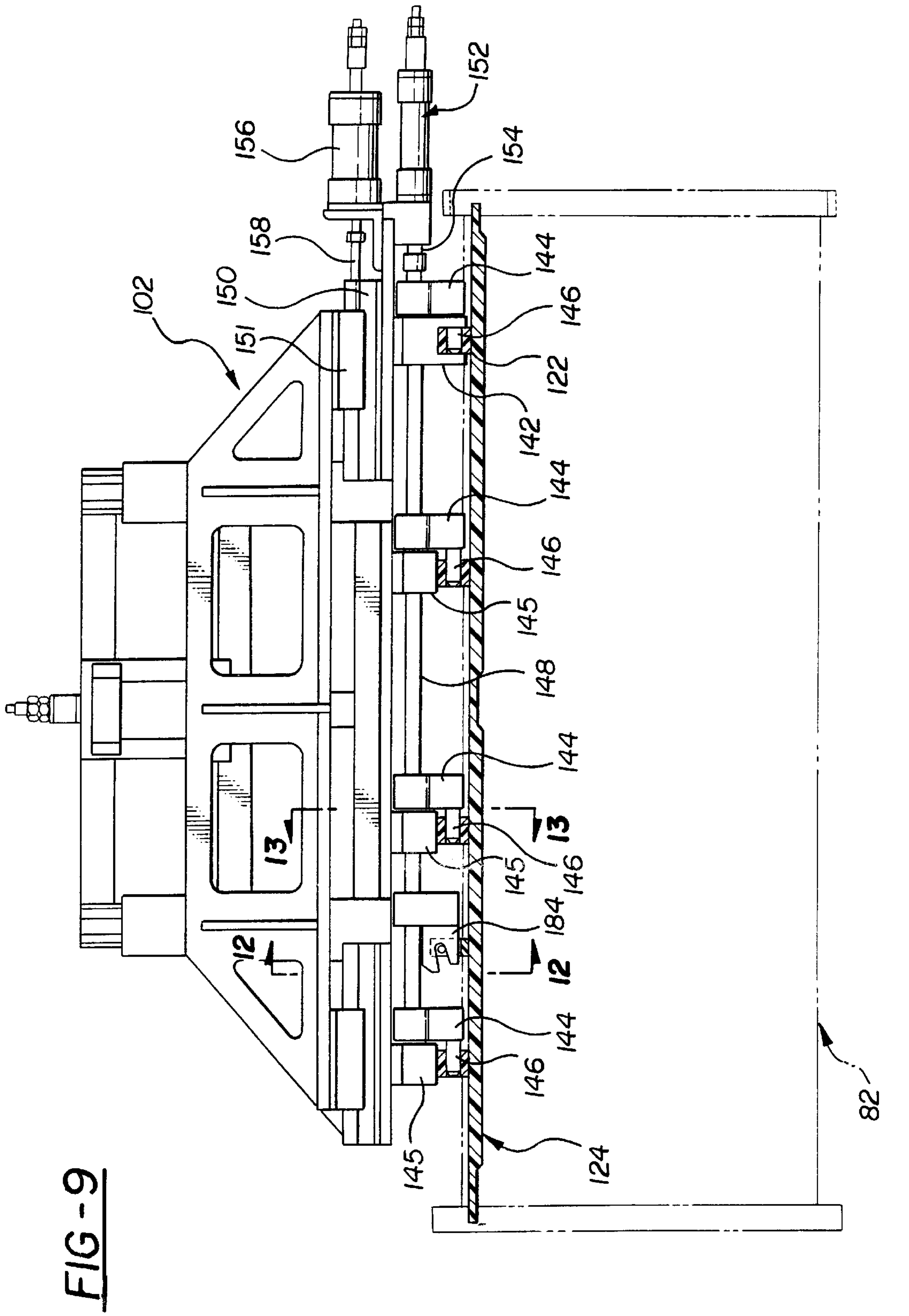
FIG. 9 is a front elevational view of the cover handling automation apparatus components for engaging the barrel cover, shown in section, portions of the barrel shown in phantom lines.
Figure 10:
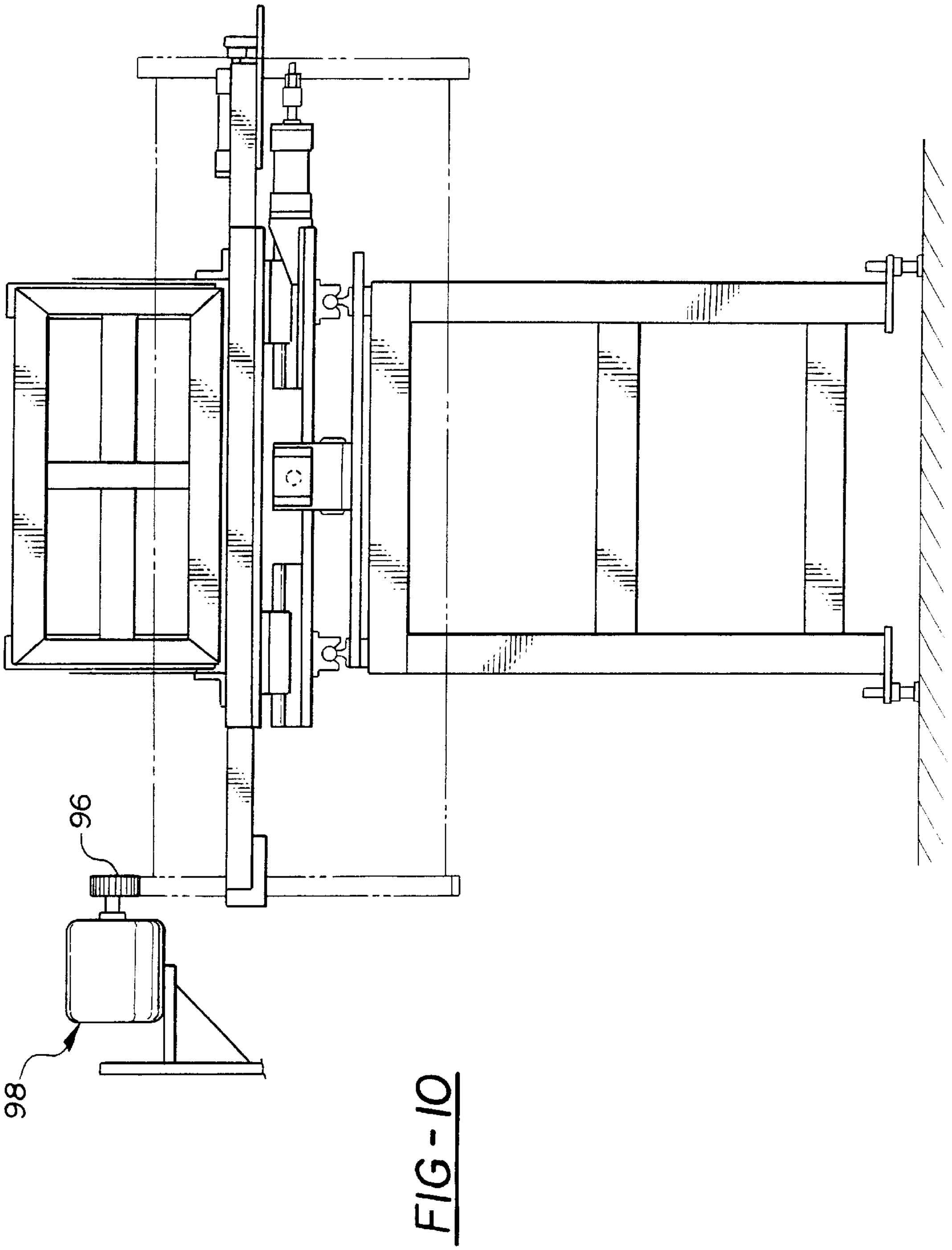
FIG. 10 is a front elevational view of the barrel assembly positioned in front of the cover handling station automation apparatus diagrammatically depicting a shuttle mounted motor for rotating the barrel assembly to a predetermined located rotary position.

With the cover 124 in a locked position on the barrel 134, and with the barrel assembly 82 precisely located endwise and rotationally, an actuator 138 is activated to carry the cover engagement power angle slide 102 down onto the cover 124 (FIG. 9). In this position, a fork piece 142 (FIG. 9) captures one of the upright pieces 122, while rod carriers 144 are located to the right of each piece 122, respective rods 146 each being aligned with a respective chamfered bore 126. The rod carriers 144 are all supported on a pair of lengthwise extending rods 148, which are in turn supported on a side to side slide power 150 supported on guides 151.

A first lengthwise actuator 152 carried by the power slide 150 has a movable output rod 154 which drives all of the rod carriers 144 to the left against stops 145 and fork piece 142 (FIG. 9), seating the rods 146 in their respective aligned bores 126 in the upright pieces 122.

A second side to side actuator 156 is connected to the drive power slide 150, with an output rod 158 connected to the structure 102.

The handle assembly 128 (FIGS. 14–16) includes a rod holder 160 fastened to a free end of a spring blade 162 with titanium screws 164. The spring blade 162 is fastened to the cover 124 at its opposite end with a clamping piece 164 by titanium screws 166. A side to side and outward restriction on the movement of the spring blade 162 is provided by a U-shaped piece 168 fastened to the cover 124 with titanium screws 170 at a point intermediate the length of the spring blade 162. An opening 172 is sized to prevent side to side movement while allowing a predetermined extent of outward deflection of the free end of the spring blade 162.

A cam rod 180 extends back over the cover 124 from one side of the rod holder 160 (cam rod 180 may also be grasped as a manual handle).

The cover tabs 130 are sized to fit between spaces 182 between the barrel tabs 132 when the cover 124 is positioned to align the same at the beginning of the cover removal cycle.

The rod holder 160 is urged down by the spring blade 162 to normally occupy one of the barrel tab spaces 182, which thus engages an adjacent barrel tab 132A, preventing the cover 124 from shifting back to prevent the cover tabs 130 from moving out from under the barrel tabs 132.

When the actuator 152 moves the rods 148 to the left, a cam piece 184 mounted thereon (FIG. 9) is also driven to the left to engage the cam rod 180, forcing the cam rod 180 to move out as seen in FIG. 12, moving the rod holder 160 away to clear the adjacent barrel tab 132.

When activated, the actuator 156 causes the slide 150 to move to the left to carry the rods 148, cover 124, and rod carriers 144 to the left, sliding the cover tabs 130 out from under the barrel tabs 132.

The actuator 138 is then operated to move the angle slide 102 and cover 124 off and away from the barrel 134. The locator actuators 116, 118 are then operated to spread the locators 106, 108 out of engagement with the barrel 134. Actuator 114 then retracts slide 110 which carries all of these parts and the cover back.

The shuttle cart 84 then moves the barrel assembly 82 to the unload station where the barrel is rotated to unload the parts, then to the load station where the barrel is loaded, then back to the cover handling station where the cover 124 is replaced by the reverse of the cycle described.

In placing the cover 124 onto the barrel 134, the handle rod holder 160 engages a barrel tab 132A and the spring blade 162 deflects to allow the rod holder 160 to move out as the cover 124 is advanced over the barrel opening 136. After the cover 124 is slid lengthwise, the rod holder 160 is moved back in by the spring blade 162 to be positioned adjacent a barrel tab 132A to lock the cover 124 in the secured position.

It will be appreciated by those skilled in the art that various sensors and limits will normally be provided to insure that the various motions have been completed at each step before proceeding with the next step, according to accepted engineering practice, as will other details not here described in the interest of clarity.

Similarly, conventional control circuitry components will be provided to activate in the proper manner and sequence the electric motors, power cylinder actuators, etc., described above. Of course, hydraulic or pneumatic control components would also be utilized in the manner well known to those skilled in the art.

What is claimed is:

1. An automation apparatus for handling a perforated finishing barrel assembly including a finishing barrel having a lengthwise extending access opening in one side thereof, and at least one cover fit into said opening, said barrel side having a lengthwise series of tabs formed along said opening and projecting towards said opening, said cover having a series of spaced apart outwardly projecting tabs formed along its length, said respective series of tabs configured to allow said cover tabs to be pushed between said barrel tabs in a lengthwise relative position of said cover over said opening, said cover tabs thereby positioned past said barrel tabs and against other portions of said barrel, said cover able to be shifted lengthwise to cause capturing of said cover tabs beneath said barrel tabs to secure said cover on said barrel; at least one locking handle assembly secured to said cover enabling positioning of said cover on said barrel overlying said opening therein and lifting of said cover from said barrel opening, said locking assembly including an engagable handle member mounted on said cover by a spring blade affixed at one end to said handle member and free at the other end so that said handle is deflectable away from said cover to a limited extent, a locking feature fixed to said barrel side positioned opposite said handle member when said series of cover tabs are aligned with spaces between said barrel spaces in said lengthwise relative position, said deflectability of said spring blade causing said locking feature to push said member away and allowing said cover to be slid to move said cover tabs past said barrel tabs with said handle member on said locking feature, said locking feature configured so that said handle member moves past said locking feature upon shifting of said cover so as to bring said cover tabs beneath said barrel tabs, whereat a side of said locking feature blocking a portion of said handle assembly positively prevents shifting movement of said cover in said opposite direction, one or more upright pieces on said cover spaced lengthwise from said handle assembly each having a bore formed thereon;

said automation apparatus including:

- a cover removal and installation station for receiving said barrel assembly;
- a cover removal and installation apparatus at said station comprising:
  - a first power slide when activated moving toward said cover opening of said barrel assembly to position one or more rods on said first slide each corresponding to a respective upright piece projecting from said cover, each rod in alignment with a bore therein;
  - a second power slide on said first slide having said one or more rods mounted thereto when activated moving said one or more rods in an endwise direction so as to enter a bore in a respective upright piece, said second slide also carrying a cam engaged with said handle member upon said axial movement of said second slide to seat said one or more rods, said cam causing said handle member to move out against the force of said spring blade to no longer block said portion of said handle assembly; and
  - a third power slide mounted on said first slide and mounting said second power slide, said third power slide moving in said endwise direction to carry said cover lengthwise to move said cover tabs out from beneath said barrel tabs, said first power slide thereafter activated to remove said cover from said barrel assembly; said third, second and first power slides activated in reverse to install said cover.

2. The automation apparatus according to claim 1 wherein said first slide carries a fork onto another upright piece on said cover to capture said cover and prevent relative endwise movement of said cover when said second power slide is actuated to move said one or more rods towards said upright pieces.

3. The automation apparatus according to claim 1 further including a horizontally moving fourth slide when activated bringing said first, second and third slides to and from said barrel assembly in said station, said first slide moving at an angle to the horizontal to move downward to said cover on said barrel assembly.

4. The automation apparatus according to claim 3 further including an endwise positioning platform power slide when activated accurately locating said first, second, third and fourth power slides carried by said endwise slide laterally with respect to said barrel assembly.

5. The automation apparatus according to claim 4 further including a motor when activated rotating said barrel assembly to a rotated position with said cover angled up and towards said first, second, third and fourth power slides.

6. The automation apparatus according to claim 4 including a locator actuator carried by said platform slide when activated pulling an end face locator into engagement with one end face of said barrel assembly, said endwise platform when activated initially moving said platform slide to carry a second end face locator away from an opposite end face of said barrel assembly, said platform power slide thereafter released to allow movement of said platform slide, said continued movement of said locator actuator pulling said platform slide until said second end face locator engages said opposite end face of said barrel assembly to thereby locate said platform slide and said first, second, third and fourth power slides with respect to said barrel assembly.

7. The automation apparatus according to claim 1 wherein said first slide carries a fork onto another upright piece on said cover to capture said cover and prevent relative endwise movement of said cover when said second power slide is actuated to move said one or more rods towards said upright pieces and to drive said cover when said third power slide is activated to move in said endwise direction to carry said cover lengthwise to move said cover tabs out from beneath said barrel tabs.

8. An automation apparatus for removing and installing a cover on a perforated finishing barrel having a rectangular loading access opening in a side thereof, said a cover adapted to be secured over said opening by sliding engagement of interfit portions of said cover and barrel side after said cover is placed in said opening, a handle attached to said cover by a spring member allowing limited movement of said handle away from said cover when said cover is lifted by said handle, and said handle moved back by said spring member when said handle is released after sliding engagement of said interfit portions, said handle movement positioning a blocking feature to prevent reverse sliding movement of said cover to release said interfit portions, said automation apparatus comprising:

a cover removal and installation station for receiving said barrel assembly;

a shuttle for moving said barrel assembly into said station;

a first power slide shown activated moving toward said cover opening of said barrel assembly to position one or more rods on said first slide corresponding to a respective upright piece projecting from said cover, each rod in alignment with a bore therein;

a second power slide on said first slide having said one or more rods mounted thereto when activated moving said one or more rods in an endwise direction so as to enter a bore in a respective upright piece, said second slide also carrying a cam engaged with said handle member upon said axial movement of said second slide to seat said one or more rods, said cam causing said handle member to move out against the force of said spring member to no longer block said portion of said handle; and a third power slide mounted on said first slide and mounting said second power slide, said third power slide when activated moving in said endwise direction to carry said cover lengthwise to move said cover tabs out from beneath said barrel tabs, said first power slide thereafter activated to remove said cover from said barrel assembly; said third, second and first power slides activated in reverse to install said cover.

9. The automation apparatus according to claim 7 further including a horizontally moving fourth slide when activated bringing said first, second and third slides to and from said barrel assembly in said station, said first slide moving at an angle to the horizontal to move downward to said cover on said barrel assembly.

10. The automation apparatus according claim 9 further including an endwise positioning platform power slide when activated accurately locating said first, second, third and fourth power slides carried by said endwise positioning platform slide laterally with respect to said barrel assembly.

11. The automation apparatus according to claim 10 further including a motor when activated rotating said barrel assembly to a rotated position with said cover angled up and towards said first, second, third and fourth power slides.

12. The automation apparatus according to claim 10 including a locator actuator carried by said platform slide when activated pulling an end face locator into engagement with one end face of said barrel assembly, said endwise platform power slide when activated initially moving said platform slide to carry a second end face locator away from an opposite end face of said barrel assembly, said platform power slide thereafter released to allow movement of said platform slide, said continued movement of said locator actuator pulling said platform slide until said second end face locator engages said opposite end face of said barrel assembly to thereby locate said platform slide and said first, second, third and fourth power slides with respect to said barrel assembly.

* * * * *